United States Patent
Coray (10) Patent No.: US 7,464,951 B2
(45) Date of Patent: Dec. 16, 2008

(54) POWERED VEHICLE FOR ON AND OFF-ROAD USE

(76) Inventor: Stephen R. Coray, 1890 W. Aspen Ave., Gilbert, AZ (US) 85233

( * ) Notice: Subject to any disclaimer, the term of this patent is extended or adjusted under 35 U.S.C. 154(b) by 587 days.

(21) Appl. No.: 11/155,867

(22) Filed: Jun. 17, 2005

(65) Prior Publication Data

US 2005/0285381 A1  Dec. 29, 2005

Related U.S. Application Data

(60) Provisional application No. 60/582,778, filed on Jun. 25, 2004.

(51) Int. Cl.
*B62K 5/00* (2006.01)

(52) U.S. Cl. .................. 280/282; 280/235; 280/266; 280/236; 280/237; 280/249; 280/250; 280/271

(58) Field of Classification Search ................ 280/266, 280/282, 235, 91.1, 248, 226.1, 267, 288.1, 280/237, 249, 271, 250; 180/65.1, 215, 65.6, 180/68.5, 250, 907, 409, 89.13, 181, 696.6

See application file for complete search history.

(56) References Cited

U.S. PATENT DOCUMENTS

| | | | |
|---|---|---|---|
| 3,771,811 A | 11/1973 | Bueno | |
| 4,069,881 A | 1/1978 | Shiber | |
| 4,073,356 A | 2/1978 | Schlicht | |
| 4,094,372 A | 6/1978 | Notter | |
| 4,143,728 A | 3/1979 | Shiber | |
| 4,160,554 A | 7/1979 | Cooney | |
| 4,202,559 A | 5/1980 | Piazza, Jr. | |
| 4,230,330 A | 10/1980 | Muhammad | |
| 4,445,699 A | 5/1984 | Darasko | |
| 5,292,141 A | 3/1994 | Ekedal et al. | |
| 5,381,870 A | 1/1995 | Kaufman | |
| 5,727,644 A * | 3/1998 | Roberts et al. | 180/409 |
| 5,915,707 A | 6/1999 | Steffen | |
| 5,950,751 A * | 9/1999 | McComber | 180/65.1 |
| 5,950,754 A | 9/1999 | Ondrish, Jr. | |
| 6,352,274 B1 * | 3/2002 | Redman | 280/248 |
| 6,402,174 B1 * | 6/2002 | Maurer | 280/267 |
| 6,902,177 B2 * | 6/2005 | Lindsay et al. | 280/282 |
| 7,100,728 B2 * | 9/2006 | Huang et al. | 180/181 |

OTHER PUBLICATIONS

Lesley Wright, Cities weigh ban on toys with engines, The Arizona Republic, Apr. 11, 2005, Phoenix, Arizona, USA.

* cited by examiner

*Primary Examiner*—Christopher Ellis
*Assistant Examiner*—Cynthia F. Collado (57) ABSTRACT

A powered vehicle and method of operating is described for on and off-road use. The powered vehicle comprises a chassis and a first and second axle coupled to the chassis having at least one wheel coupled to the first axle and at least two wheels coupled to the second axle. The powered vehicle further comprises a movable seat configured to support a rider sitting down on the seat, and configured to move relative to the chassis in order to provide a steering mechanism for the powered vehicle. For example, the movable seat provides a mechanism for the rider to shift his or her weight relative to the chassis to cause the steering mechanism for the powered vehicle.

20 Claims, 14 Drawing Sheets

POWERED VEHICLE FOR ON AND OFF-ROAD USE

CROSS-REFERENCE TO RELATED APPLICATIONS

This application is related to and claims priority to U.S. provisional application Ser. No. 60/582,778 filed on Jun. 25, 2004; the entire contents of which are herein incorporated by reference

BACKGROUND OF THE INVENTION

1. Field of the Invention

The present invention relates to a powered vehicle and a method of using and, more particularly, to a powered vehicle having a movable seat, whereby movement of the movable seat by the rider facilitates steering of the powered vehicle.

2. Description of Related Art

Throughout history, people of all ages, from young to old, have enjoyed the thrills of powered vehicles, which includes everything from aircraft, to watercraft, to ground vehicles for on and off-road use. In the latter, people have enjoyed the adrenaline rush of racing go-carts on tracks, and have entertained the rigor and vigor of racing off-road vehicles, such as all-terrain vehicles and dune buggies. Whether the use is intended for recreational purposes or competitive purposes or merely transportation purposes, more and more, the popularity of powered vehicles is on the rise, which is evident in the number of different types of vehicles now commercially offered to satisfy the different imaginations, demands, and styles of all of us. However, with all that is commercially offered, we, as enthusiasts of on-road and off-road vehicles, demand vehicles with greater speed and handling performance, as well as convenience for handling and storage.

SUMMARY OF THE INVENTION

One embodiment of the invention is to provide a powered vehicle having a movable seat, whereby movement of the seat by the rider facilitates steering of the powered vehicle.

According to another embodiment of the invention, a powered vehicle configured to support a rider is described, comprising: a chassis comprising a first axle coupled to a first end of the chassis and a second axle coupled to a second end of the chassis opposite the first end, wherein the first axle is coupled to at least one wheel and the second axle is coupled to at least two wheels; a drive system coupled to the first axle or the second axle, and configured to propel the vehicle by transmitting power to the at least one wheel coupled to the first axle or the at least two wheels coupled to the second axle; and a movable seat movably coupled to the chassis and configured to support the rider sitting down on the movable seat, wherein movement of the movable seat relative to the chassis provides a steering mechanism for the powered vehicle.

According to yet another embodiment, a method for operating a powered vehicle is described, comprising: starting a drive system configured to propel the powered vehicle on a ground surface; coupling the drive system to a drive wheel coupled to the powered vehicle; engaging the drive wheel to the ground surface via a clutch mechanism operated by a rider; steering the powered vehicle by shifting the weight of the rider relative to the powered vehicle by moving the rider on a movable seat movably coupled to the powered vehicle; and decelerating the powered vehicle.

DETAILED DESCRIPTION OF EXEMPLARY EMBODIMENTS

In the following description, in order to facilitate a thorough understanding of the invention and for purposes of explanation and not limitation, specific details are set forth, such as a particular geometry of the powered vehicle and descriptions of various components. However, it should be understood that the invention may be practiced in other embodiments that depart from these specific details.

Figure 1:
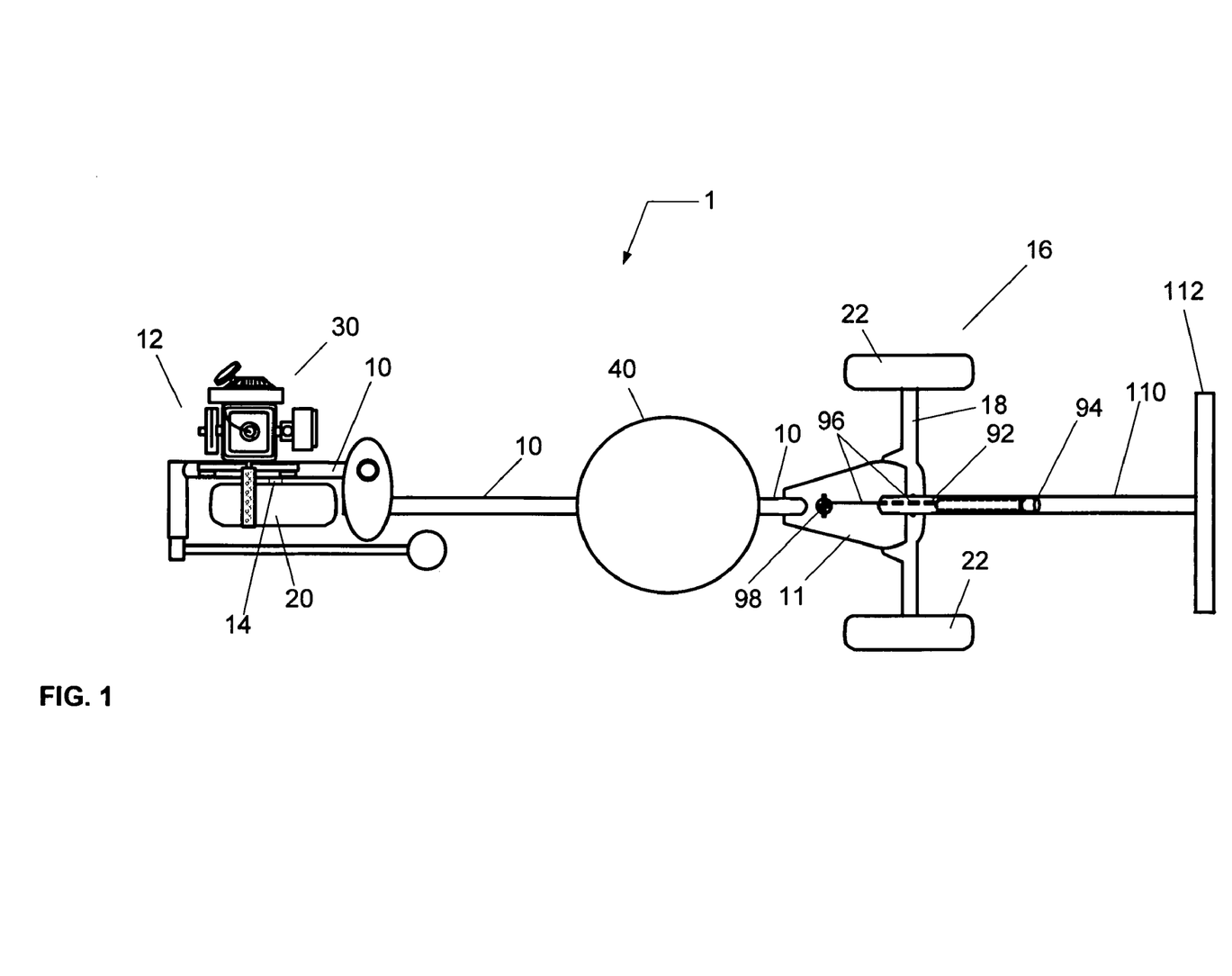
FIG. 1 presents a top view of a simplified schematic representation of a powered vehicle according to an embodiment of the invention.

Referring now to the drawings, wherein like reference numerals designate identical or corresponding parts throughout the several views, FIG. 1 presents a top view of a schematic representation of a powered vehicle 1 comprising a chassis 10 having a first axle 14 coupled to a first end 12 of the chassis 10 and a second axle 18 coupled to a second end 16 of the chassis 10 opposite the first end 12, wherein the first axle 14 is coupled to one drive wheel 20 that may propel the vehicle and the second axle 18 is coupled to two wheels 22 that may steer the vehicle.

The chassis 10 may be fabricated from a high strength material, such as chrome moly steel. For example, the chassis 10 can be fabricated from several sections of hollow stainless steel tubing welded in a manner depicted in FIG. 1. Alternatively, the first axle 14, or the second axle 18, or both the first axle 14 and the second axle 18 can be coupled to the chassis 10 via a truck. Alternatively, the first axle 14, or the second axle 18, or both the first axle 14 and the second axle 18 can be coupled to the chassis 10 via a suspension system.

Although a single drive wheel 20 is shown to be coupled to the first axle 14, more than one wheel may be employed. Additionally, although two wheels 22 are shown to be coupled to the second axle 18, more than two wheels may be employed. For instance, the total number of wheels coupled to the powered vehicle 1 may be three, or four, or more. Any one of the plurality of wheels may include, but should not be limited to, tire compounds that may be solid or pneumatic. For example, any one of the plurality of wheels can include a Go-Kart pneumatic tire, or a Skateboard-type solid wheel.

Referring still to FIG. 1, the powered vehicle 1 further comprises a drive system 30 coupled to drive wheel 20 on first axle 12, and configured to propel powered vehicle 1 by transmitting power to drive wheel 20. Although the drive system 30 is shown to be coupled to drive wheel 20 on first axle 14, it may alternately be coupled to wheels 22 on second axle 18. Drive system 30 can include a power source, a clutch mechanism, and/or a transmission system.

Referring still to FIG. 1, the powered vehicle 1 further comprises a seat 40 movably coupled to chassis 10, and configured to support a rider sitting down on seat 40, wherein movement of seat 40 relative to chassis 10 provides a steering mechanism for powered vehicle 1. For example, as the rider moves on the powered vehicle 1 by shifting his or her weight using the movable seat 40, the center of gravity of the rider relative to chassis 10 varies causing the chassis 10 to tilt relative to the first axle 14, or the second axle 18, or both and, hence, cause the powered vehicle 1 to steer in a direction substantially the same as the shift in the rider's center of gravity.

Figure 2:
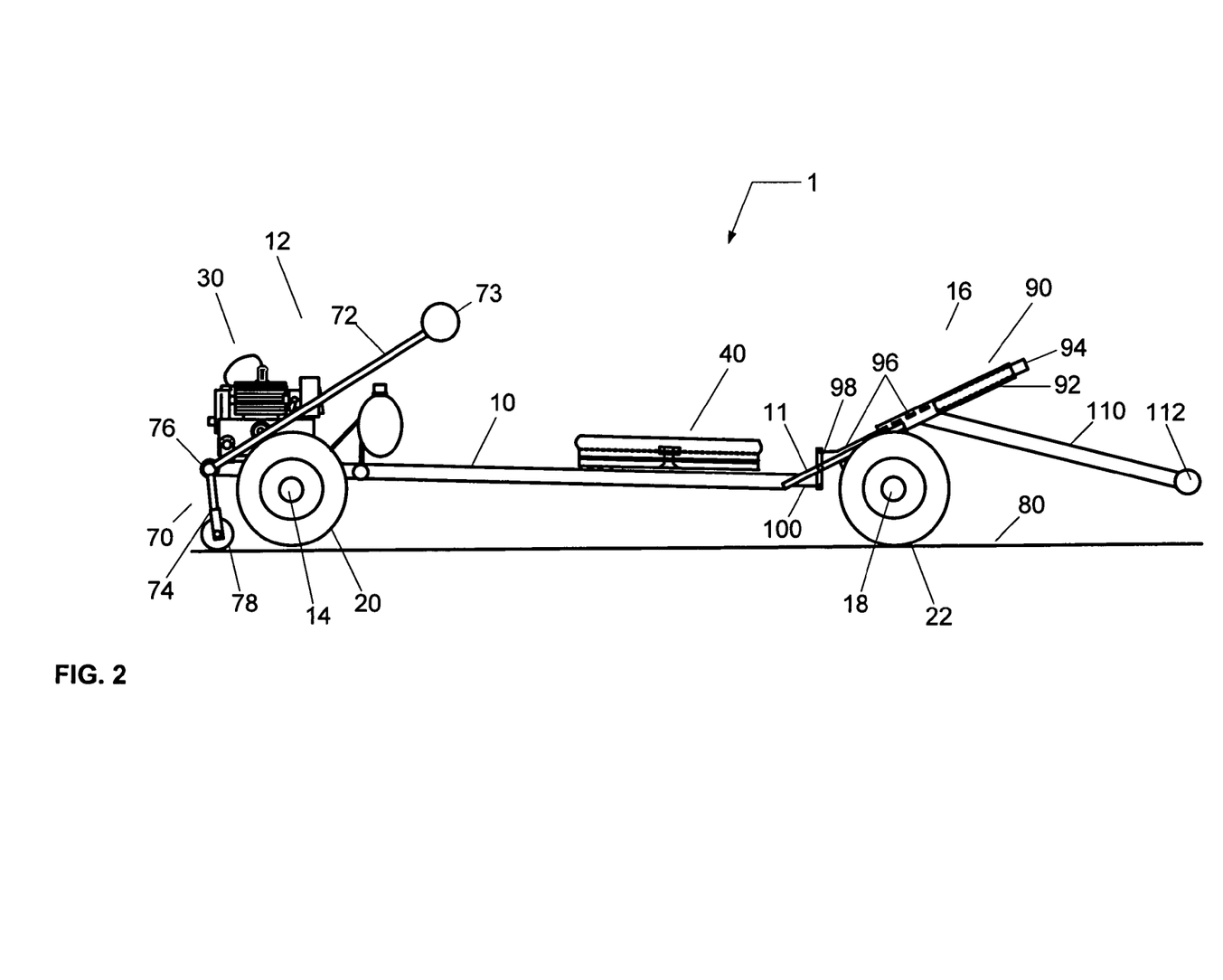
FIG. 2 presents a side view of the simplified schematic representation of the powered vehicle depicted in FIG. 1.
Figure 3:
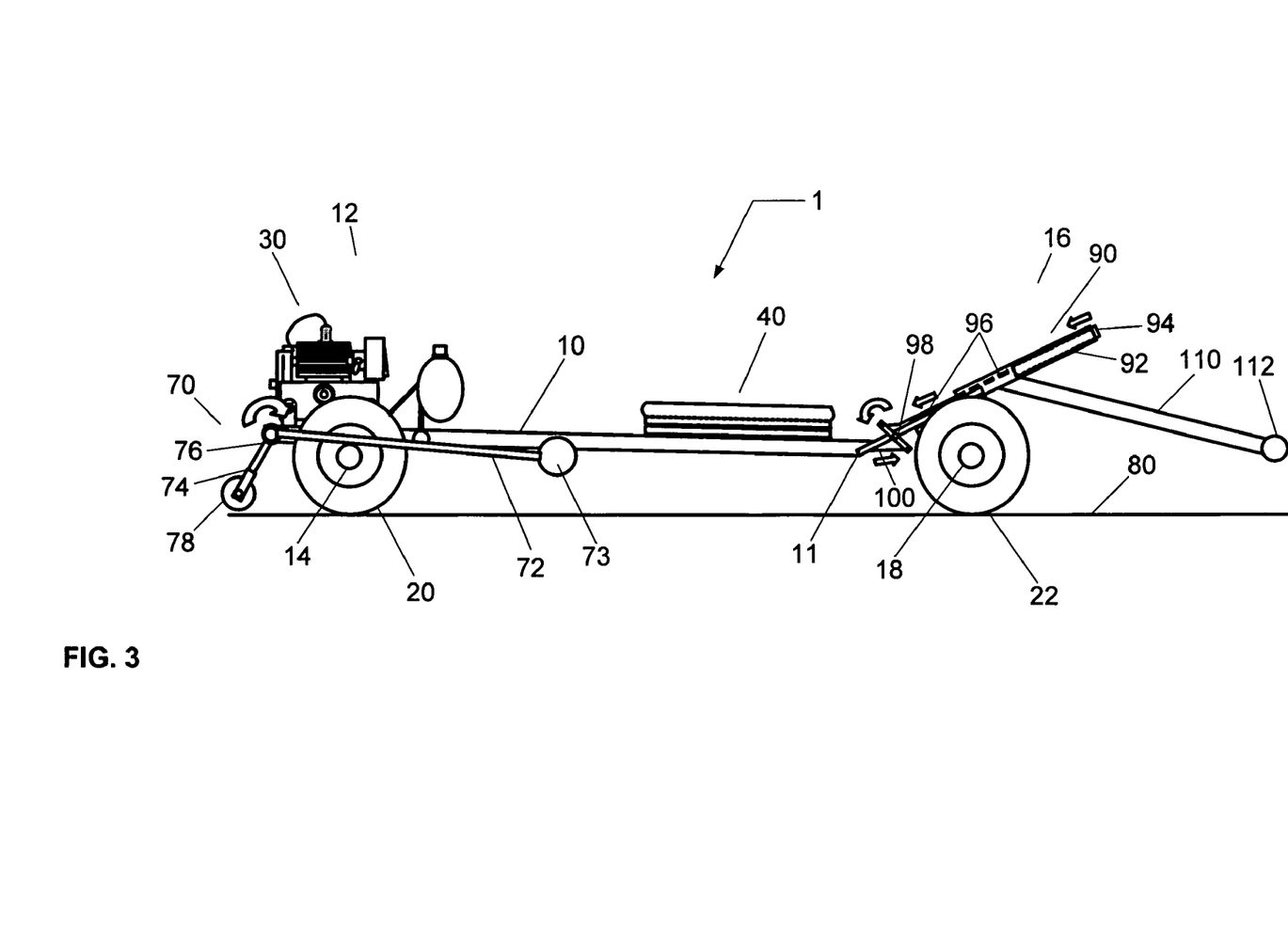
FIG. 3 presents another side view of a simplified schematic representation of a powered vehicle depicted in FIG. 1.
Figure 4:
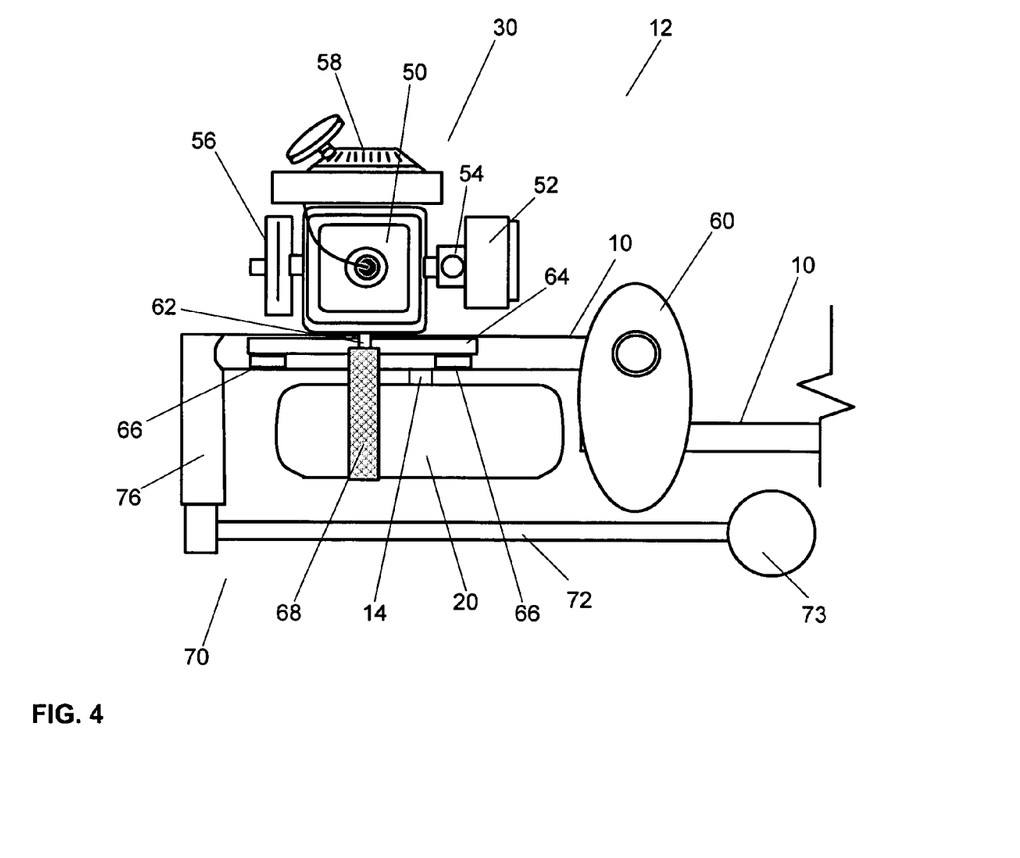
FIG. 4 provides an exploded top view of an end of the powered vehicle depicted in FIG. 1.
Figure 5:
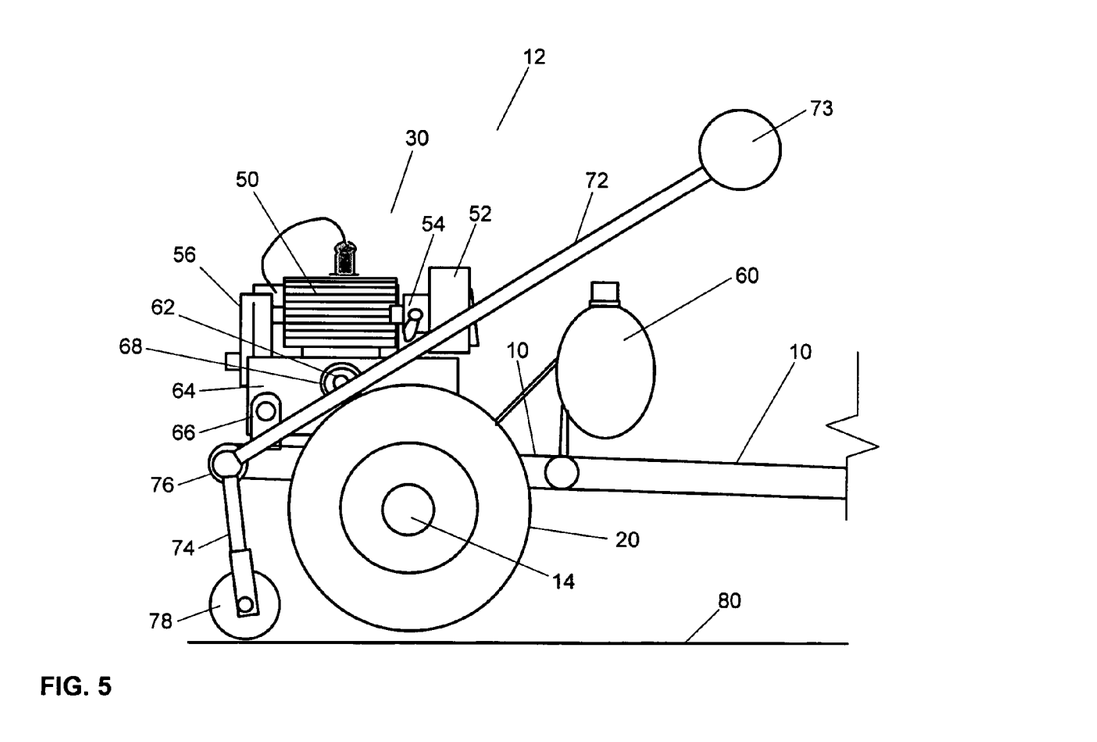
FIG. 5 provides an exploded side view of an end of the powered vehicle depicted in FIG. 1.

FIGS. 2 and 3 present a side view of a schematic representation of powered vehicle 1, and FIGS. 4 and 5 show an exploded view of the first end 12 of the powered vehicle 1 depicted in FIG. 1. As shown in FIG. 4, the drive system 30 comprises a motor 50, such as an internal combustion engine, having, for example, an intake 52, a carburetor 54, an exhaust 56, a starter 58, a fuel tank 60, and a drive shaft 62 configured to couple with drive wheel 20. For instance, the motor 50 can include a two-stroke, or four-stroke engine, such as a 2.5 Hp toy motor, commercially available from Sikk Toy Motors, or a Model No. GXH50QXA 2.5 Hp 7000 RPM Honda Engine, commercially available from Honda Engines. Additionally, for instance, starter 58 can include a pull-cord starter. Alternatively, starter 58 can include an electronic starter.

Alternately, motor 50 comprises an electric motor powered by a battery or battery pack.

Referring again to FIGS. 2, 3, 4, and 5, the drive system 30 further comprises a transmission system configured to couple the output shaft power from motor 50 to drive wheel 20 and enable the propulsion of the powered vehicle 1. For example, the transmission system may include a manual transmission system or an automatic transmission system. As shown in FIG. 4, the transmission system comprises a wheel coupling member 68 that comprises a cylindrical shaft having an outer surface configured to make contact with the radial edge of drive wheel 20. As the drive shaft 62 and wheel coupling member 68 rotate, drive wheel 20 rotates in an opposing direction. For example, the wheel coupling member 68 can comprise a knurled surface, such as a diamond pattern knurl, or another surface or material sufficient for a frictional coupling with drive wheel 20. The wheel coupling member 68 can, for example, be fabricated from aluminum or steel.

Additionally, the transmission system comprises a clutch mechanism, such as manual clutch 70. When clutch 70 is engaged, the drive wheel 20 is rotating and the powered vehicle 1 is in an idle position. When clutch 70 is dis-engaged, the drive wheel is rotating and the powered vehicle is in motion. The manual clutch 70 comprises a first lever arm 72 and a second lever arm 74, each fixedly coupled to a pivot hinge 76, which is coupled to chassis 10. The pivot hinge 76 permits rotation of the first and second lever arms, 72 and 74, relative to chassis 10. Additionally, the first lever arm may optionally include a handle 73 coupled to an end of the first lever arm 72 opposite the pivot hinge 76. Furthermore, the second lever arm 74 comprises a ground engagement wheel 78 coupled to an end of the second lever arm 74 opposite pivot hinge 76. As illustrated in FIGS. 2 and 5, when the first lever arm 72 is positioned as shown, the first end 12 of powered vehicle 1 is lifted upward from ground surface 80 and drive wheel 20 is not in contact with ground surface 80. During this time, power is transmitted to drive wheel 20 from drive system 30 to rotate drive wheel 20 prior to engaging with the ground surface 80. As illustrated in FIG. 3, when the first lever arm 72 is rotated in the clockwise direction by the rider, the second lever arm 74 rotates clockwise about the pivot hinge 76, such that drive wheel 20 is lowered to and engages with the ground surface 80 as the ground engagement wheel 78 lifts upward from the ground surface 80, thereby acting as a clutch mechanism for the powered vehicle 1.

Referring again to FIGS. 2 through 5, the motor 50 is mounted on an engine mount 64, which is coupled to chassis 10 via a plurality of mounting brackets 66. The mounting brackets 66 facilitate adjustment of the height of the motor 50 on engine mount 64, such that wheel coupling member 68 engages drive wheel 20. For example, as drive wheel 20 wears in time during use, the position of engine mount 64 can be adjusted to compensate for such wear and maintain contact between the wheel coupling member 68 and drive wheel 20. The engine mount 64 can be fabricated from a lightweight material, such as aluminum. Additionally, the mounting brackets 66 may be fabricated from a lightweight material, such as aluminum.

Figure 6:
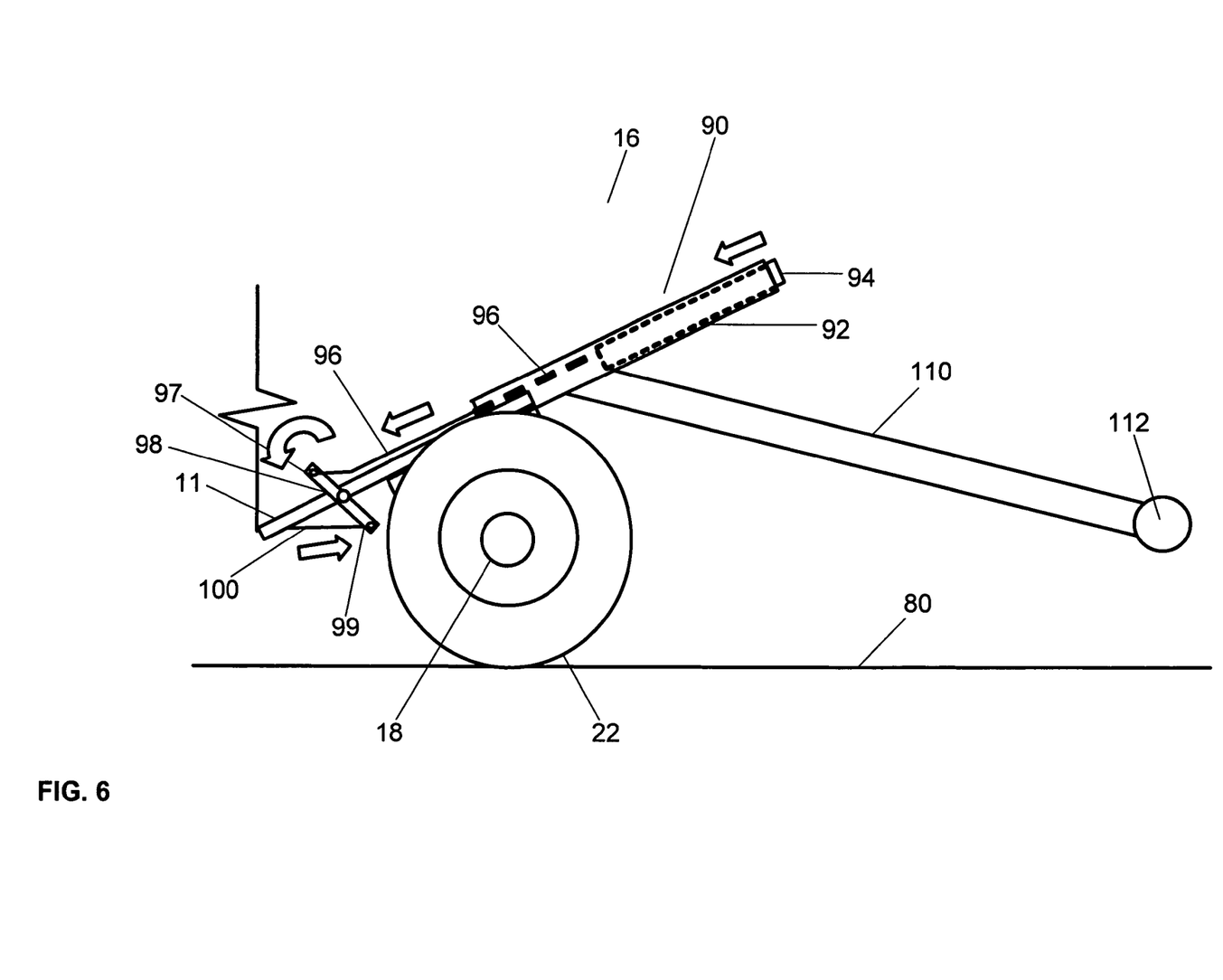
FIG. 6 provides an exploded side view of an opposite end of the powered vehicle depicted in FIG. 1.

Referring again to FIGS. 1 and 2, chassis 10 is shown to be substantially parallel with ground surface 80. However, proximate the second end 16 of chassis 10, the chassis 10 is inclined relative to ground surface 80, whereby the second axle 18 is coupled to the inclined portion of chassis 10 via two or more springs and a pivot joint that permits the second axle 18 to rotate about an axis substantially parallel with the inclined portion of chassis 10. For example, the inclined portion of chassis 10 can include an inclined plate 11 (see FIG. 6), to which the second axle 18 may be coupled. This rotation of the second axle 18 due to, for instance, the movement of seat 40 as the rider shifts his or her weight can provide a steering mechanism for powered vehicle 1.

Figure 9:
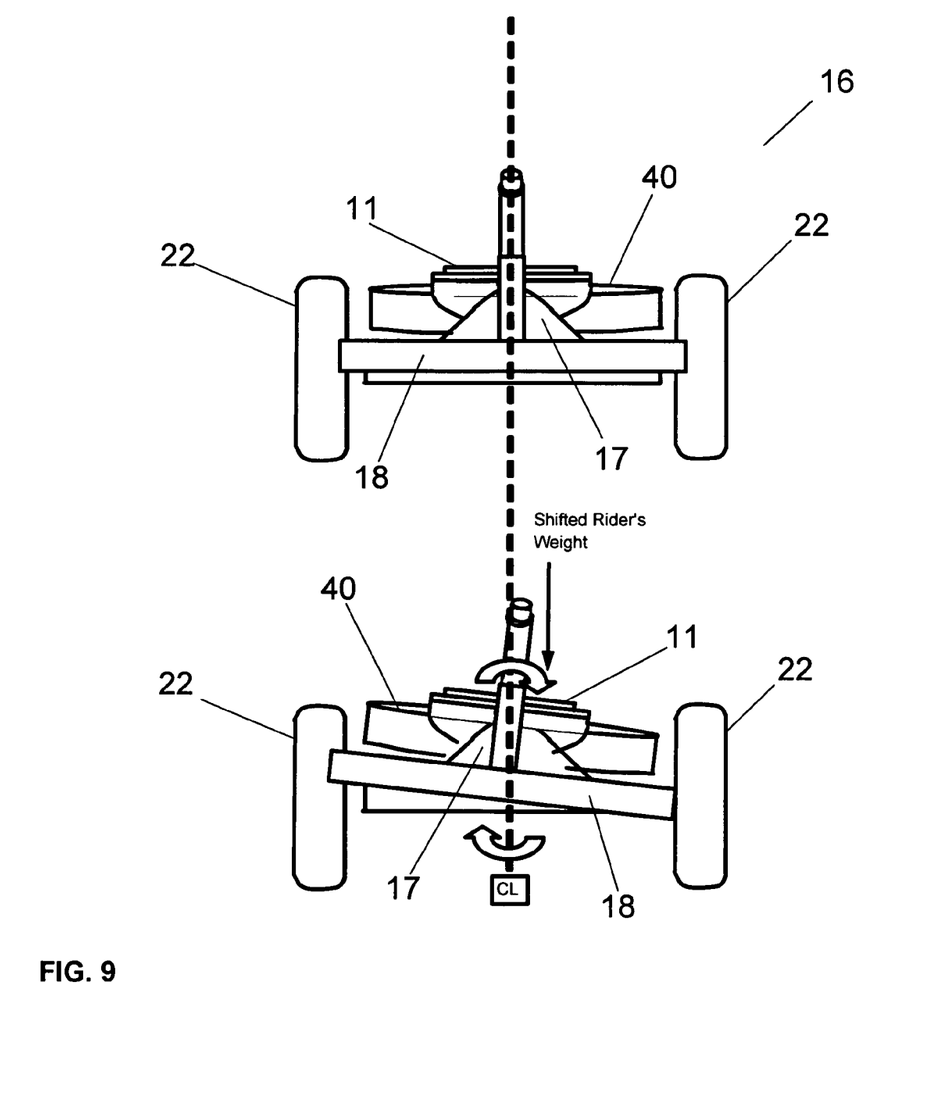
FIGS. 9 and 10 illustrate a steering mechanism for a powered vehicle according to an embodiment of the invention.
Figure 10:
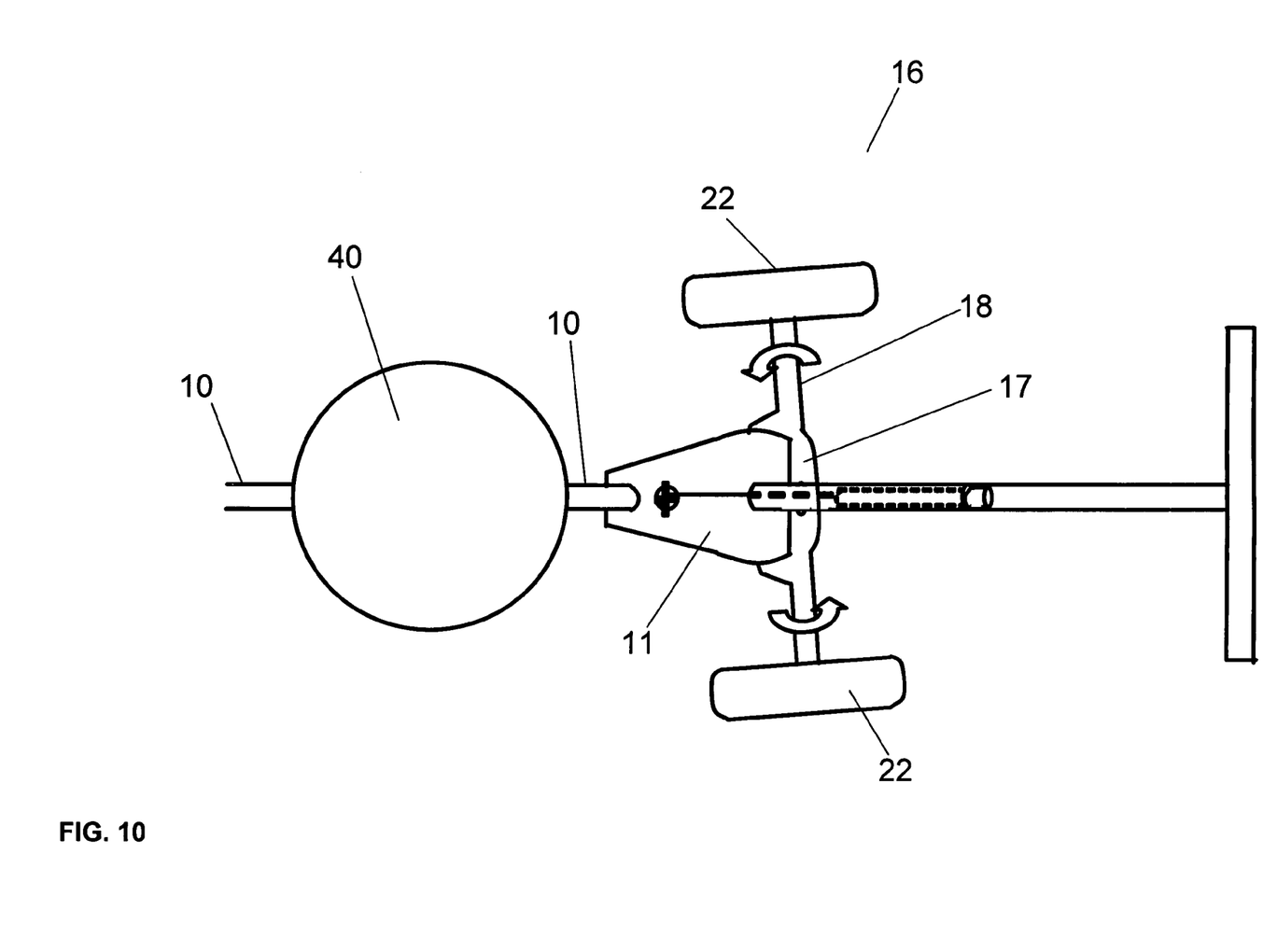

As described above, when the rider moves on the powered vehicle 1 by shifting his or her weight using the movable seat 40, the center of gravity of the rider relative to chassis 10 varies causing the chassis 10 to tilt relative to the second axle 18. As the chassis 10 tilts, the second axle turns due to the inclination of the inclined portion of chassis 10 and, hence, cause the powered vehicle 1 to steer in a direction substantially the same as the shift in the rider's center of gravity. As shown in FIGS. 9 and 10, the second axle 18 is coupled to the inclined plate 11 of chassis 10 via a pivot assembly 17 that may include a pivot joint and two or more coil springs. For example, the second axle 18 and pivot assembly 17 can include a truck axle, such as a Model No. MBS 16" Matrix Truck, commercially available from MBS Mountainboards. Additionally, as illustrated in FIG. 9, when the rider shifts his or her weight relative to the center of gravity of the powered vehicle 1 by moving on the movable seat 40, the chassis 10 tilts relative to the second axle 18. When the second axle 18 is coupled to an inclined portion of the chassis 10, such as inclined plate 11, the second axle 18 twists as illustrated in FIG. 10, such that powered vehicle 1 steers in a direction consistent with the shift of rider's weight on movable seat 40.

Figure 11A:
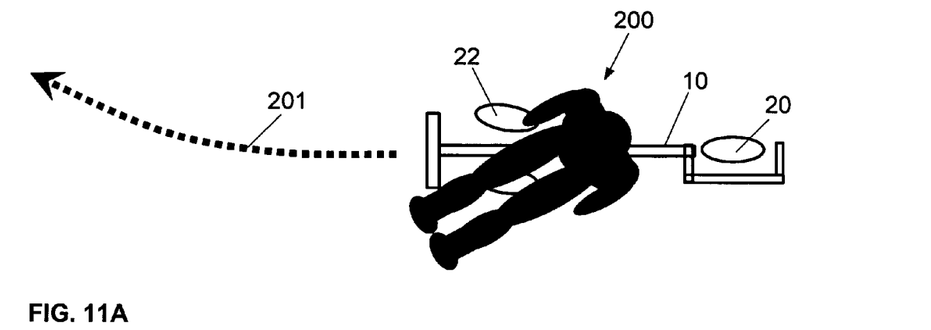
FIGS. 11A through C illustrate a rider steering a powered vehicle according to an embodiment of the invention.
Figure 11B:
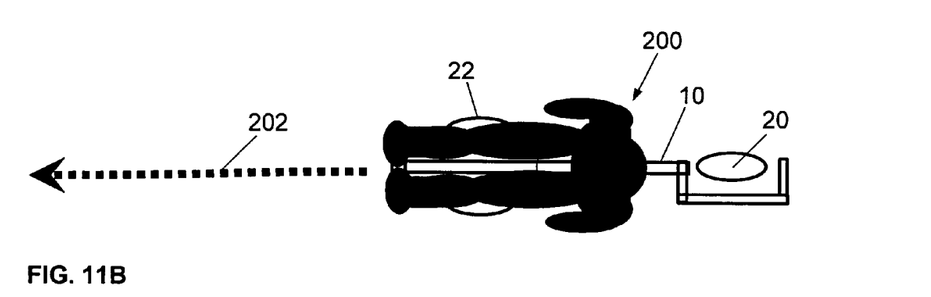
Figure 11C:
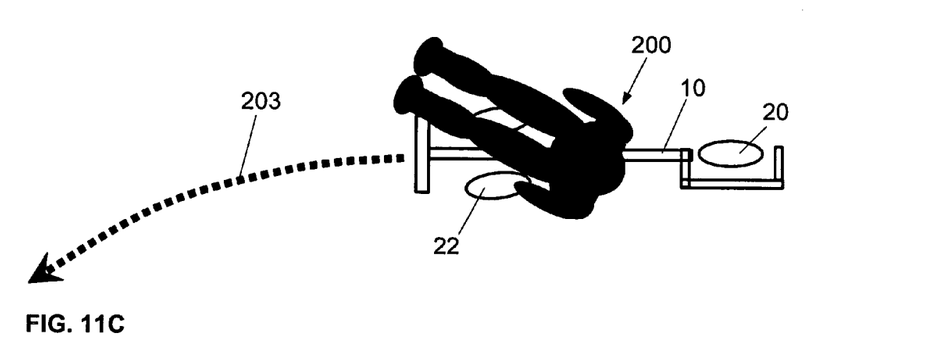

For example, as illustrated in FIGS. 11A through 11C, as rider 200 shifts his or her weight from the right side (FIG. 11A), to being aligned with the powered vehicle (FIG. 11B), to the left side (FIG. 11C), the powered vehicle is directed to the right, straight, and to the left, respectively. For example, the rider's weight may be shifted to the opposite side of the chassis as the rider's legs are swung out (the rider's legs may act as a balance to counter the rider's shifting of his or her weight). Thus, as the rider's weight is shifted inward towards the center of the turning radius of curvature, the rider's back faces the center of the turning radius of curvature.

Figure 7:
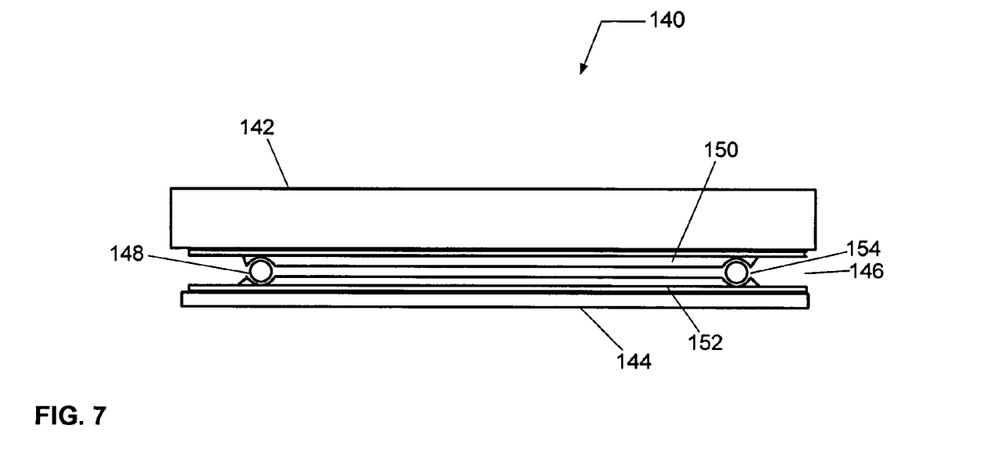
FIG. 7 depicts a seat configured to be movably coupled to a powered vehicle according to another embodiment of the invention.

Referring now to FIG. 7, a movable seat 140 is provided according to one embodiment. Movable seat 140 comprises a seat plate 142 movably coupled to a lower plate 144 via a rotational bearing assembly 146, wherein the rotational bearing assembly 146 provides a rotational joint between the seat plate 142 and the chassis 10. The lower plate 144 is fixedly coupled to chassis 10. The rotational bearing assembly 146 can comprise a set of ball bearings 148 positioned between an upper journal 150 and a lower journal 152 that forms race 154.

Figure 8:
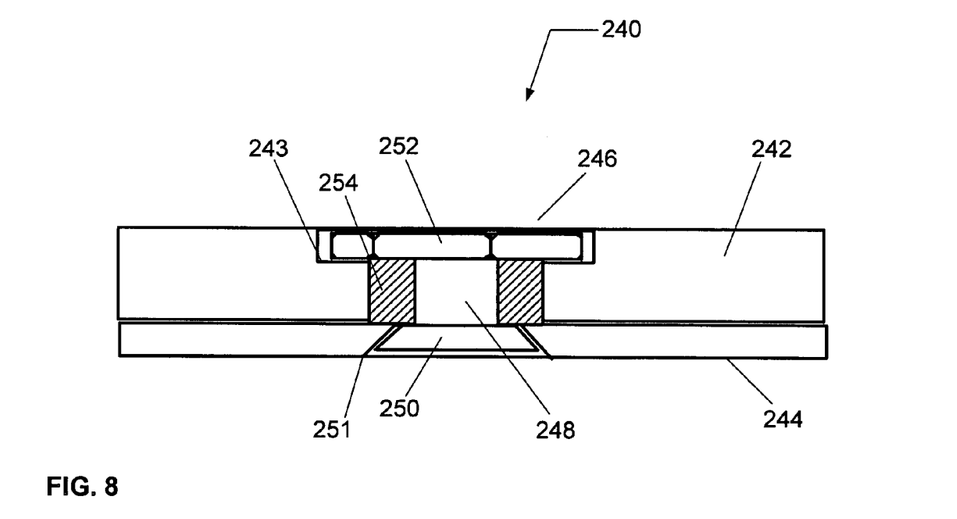
FIG. 8 depicts a seat configured to be movably coupled to a powered vehicle according to another embodiment of the invention.

Referring now to FIG. 8, a movable seat 240 is provided according to an alternate embodiment. Seat 240 comprises a seat plate 242 movably coupled to a lower plate 244 via seat retention assembly 246. The lower plate 244 is fixedly coupled to chassis 10. For example, seat retention assembly 246 can include a bolt 248 having a countersunk head 250 configured to mate with countersink 251 in lower plate 244, a (e.g., hexagonal) nut 252 configured to mate with bolt 248, and a bushing 254. The seat retention assembly 246 is configured to capture the seat plate 242 at shoulder 243 and couple seat plate 242 to lower plate 244 while permitting rotation of seat plate 242 relative to lower plate 244. In order to permit rotation of the seat plate 242 relative to the lower plate 244, the seat plate can be fabricated from a lubricious material, such as a plastic.

Alternatively, the movable seat comprises a pivot joint configured to permit rotation of the movable seat relative to the chassis about an axis substantially parallel to the chassis. For instance, the pivot joint can include one or more springs. Alternatively, the movable seat comprises a translational joint configured to permit translation of the movable seat relative to the chassis. For instance, the translational joint comprises a linear (translational) bearing.

Referring again to FIGS. 1, 2, 3, and 6, powered vehicle 1 may further include a throttle mechanism 90 configured to increase or decrease power transmitted to drive wheel 20 and accelerate or decelerate powered vehicle 1. The throttle mechanism 90 can comprise a throttle handle 92 having a throttle slide 94 at one end, wherein the throttle handle 92 is configured to retain the throttle slide 94 therein. The throttle handle 92 is fixedly coupled to chassis 10, and is configured to provide access of the throttle mechanism 90 to the rider sitting on powered vehicle 1, whereby when the rider presses the throttle slide 94 in throttle handle 92, the powered vehicle 1 is accelerated. The throttle slide 94 is coupled to a rigid wire 96 which passes through throttle handle 92 and couples to a first end 97 of a rocker joint 98. A semi-rigid wire 100 couples to a second end 99 of rocker joint 98, passes through chassis 10, and couples to the throttle on drive system 30. For instance, when the throttle slide 94 is pressed, the rigid wire 96 pushes through the throttle handle 92, resulting in the semi-rigid wire 100 pulling through chassis 10.

Referring still to FIGS. 1, 2, 3, and 6, powered vehicle 1 can further include an extension 110 having a foot rest 112. The extension 110 may be fixedly coupled to chassis 10, or it may be foldable, detachable, or retractable. Furthermore, the powered vehicle can include one or more hand grips (not shown) coupled to the chassis behind or in front of the rider as he or she faces the second end 16, and configured to provide a handle for the rider.

Additionally, the powered vehicle 1 can further comprise a braking system (not shown) configured to decelerate the powered vehicle. According to one example, the braking system comprises a braking lever coupled to the chassis, and configured to decelerate the powered vehicle when activated by the rider to drag on the ground surface which the powered vehicle moves. According to yet another example, the braking system comprises a braking lever coupled to said chassis, and configured to decelerate the powered vehicle when activated by the rider to apply friction to one or more wheels of the at least one wheel coupled to the first axle and the at least two wheels coupled to the second axle.

The powered vehicle 1, as depicted in FIGS. 1 through 8, can be fabricated, as described above, to be lightweight. For example, the weight of powered vehicle 1 can be less than or equal to 70 pounds, and may, for example, range from approximately 10 pounds to approximately 40 pounds. By way of further example, the weight of powered vehicle 1 can range from approximately 10 pounds to approximately 30 pounds, and desirably, the weight of powered vehicle 1 can range from approximately 10 pounds to approximately 20 pounds.

Figure 12A:
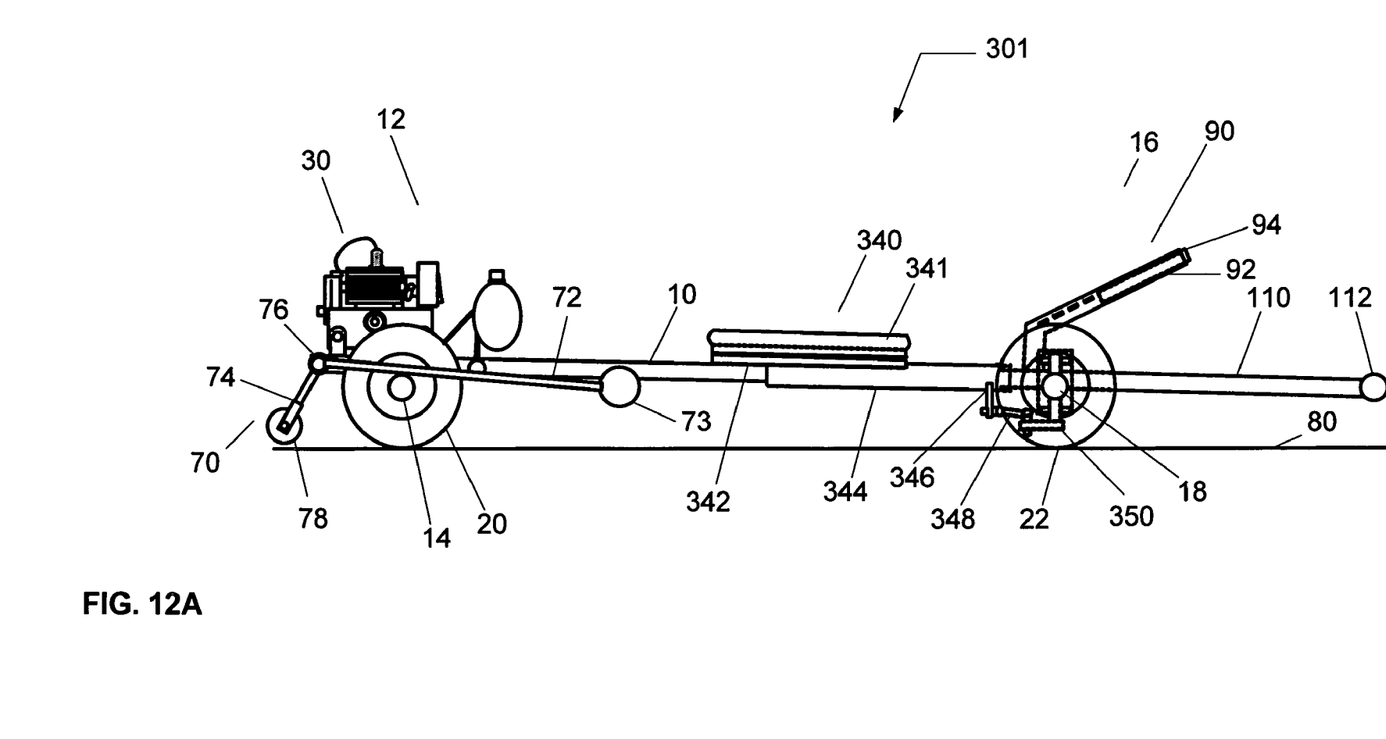
FIG. 12A presents a side view of the simplified schematic representation of a powered vehicle according to another embodiment of the invention.
Figure 12B:
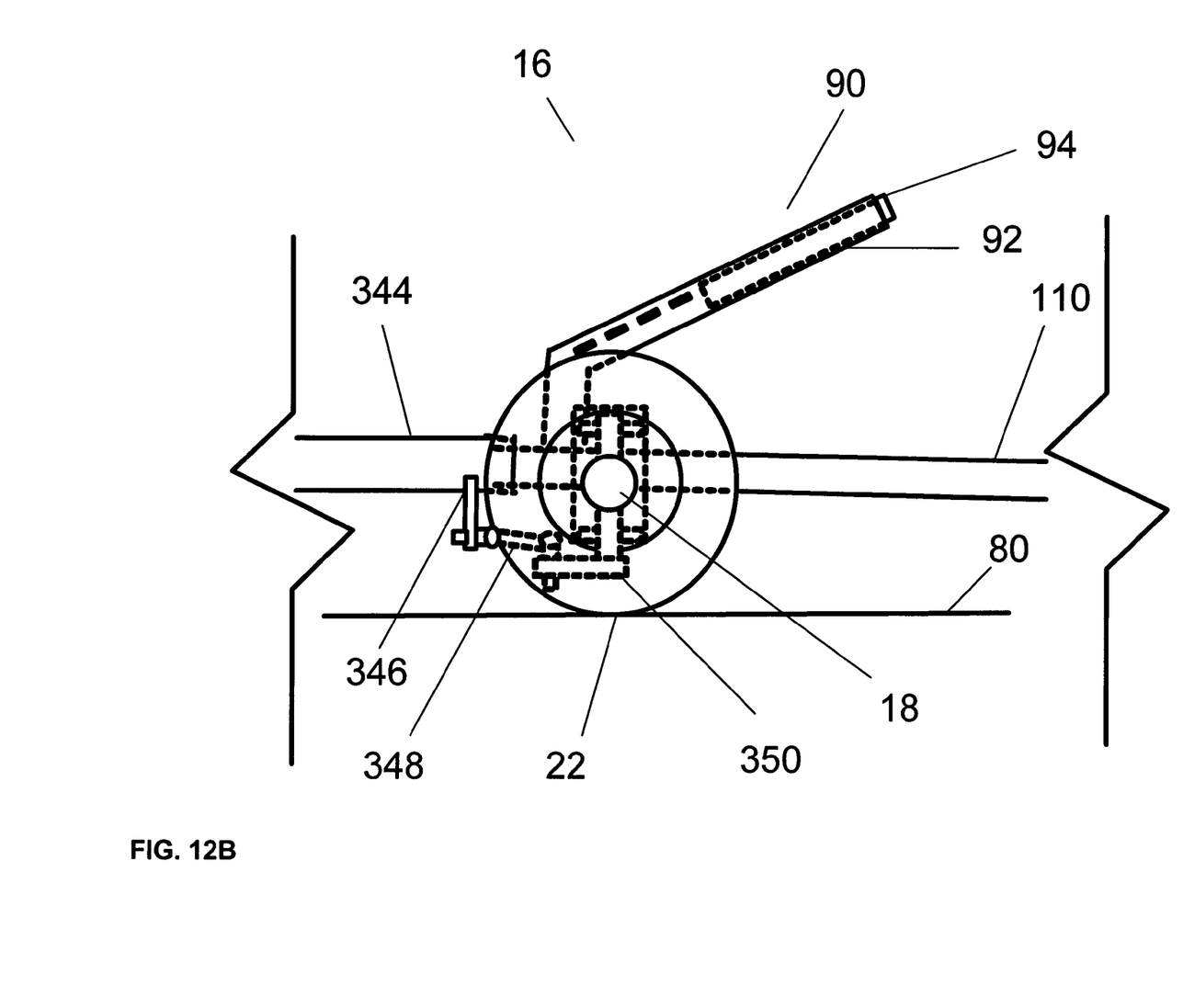
FIG. 12B presents an exploded side view of the simplified schematic representation of the powered vehicle depicted in FIG. 12A.
Figure 13:
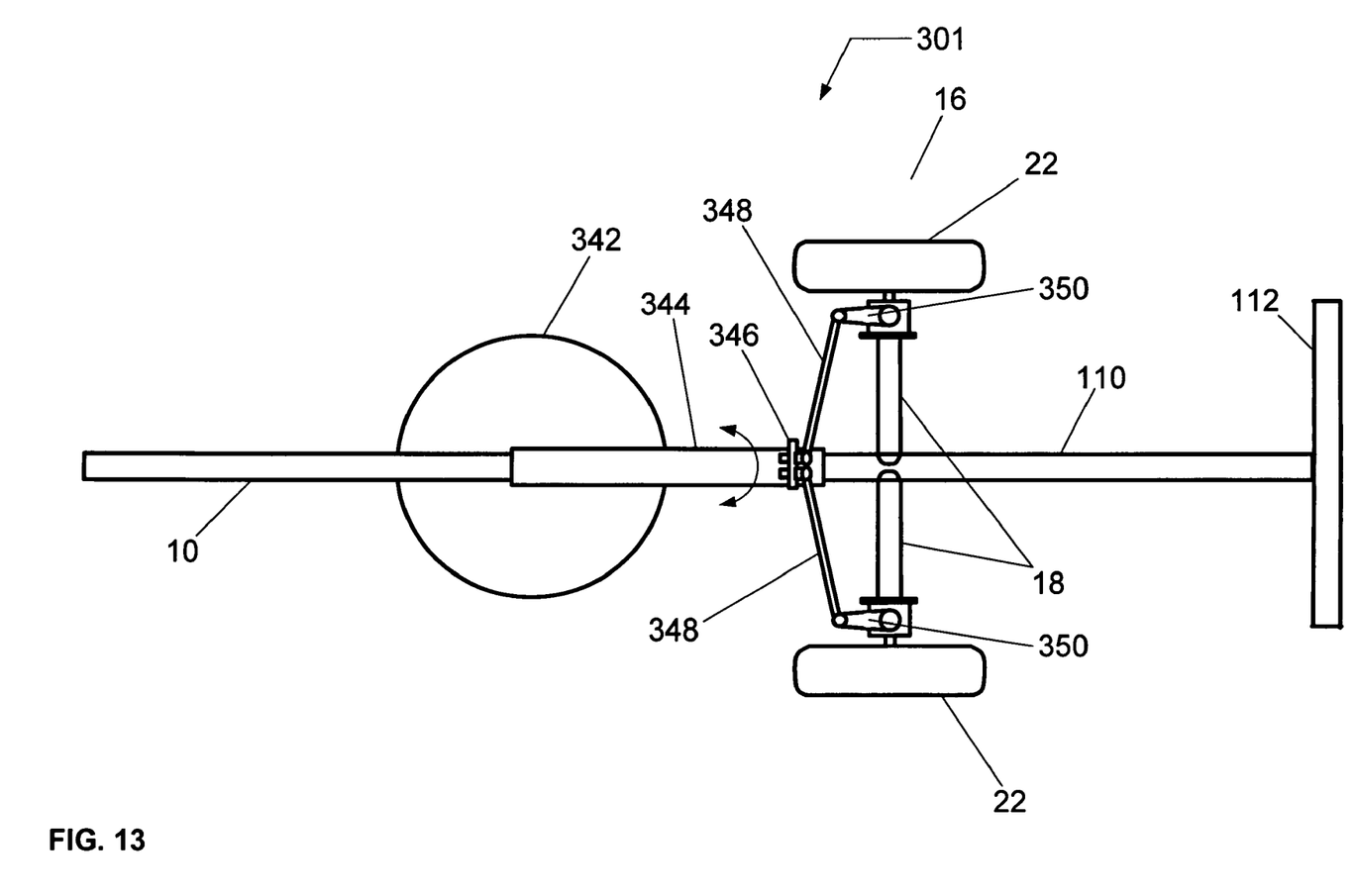
FIG. 13 presents a bottom view of the simplified schematic representation of the powered vehicle depicted in FIG. 12A.

Referring now to FIGS. 12A, 12B and 13, a side view, an exploded side view and a bottom view of a schematic representation of a powered vehicle 301 is depicted according to another embodiment. The powered vehicle 301 can, for example, be similar to the embodiment of FIGS. 1 through 6, wherein like reference numerals designate identical or corresponding parts. The powered vehicle 301 further comprises a seat 340 movably coupled to chassis 10, and configured to support a rider sitting down on seat 340, wherein movement of seat 340 relative to chassis 10 provides a steering mechanism for powered vehicle 301.

As illustrated in FIGS. 12A, 12B and 13, the movable seat 340 is coupled to a steering assembly 344. The movable seat 340 comprises a lower plate 342 configured to be coupled to steering assembly 344, and may comprise a seat plate 341 movably coupled to the lower plate 342 via a rotational bearing assembly, as described in FIG. 7. Alternatively, the movable seat 340 may comprise a seat plate movably coupled to the lower plate 344 via a seat retention assembly, as described in FIG. 8. Alternatively, the movable seat 340 can comprise a seat plate fixedly coupled to the lower plate 342. For example, the lower plate 342 and the steering assembly 344 can be welded together.

Referring still to FIGS. 12A, 12B and 13, the steering assembly 344 can, for example, comprise a cylinder concentrically aligned with chassis 10, thus permitting the steering assembly 344 to rotate about the chassis 10 along an axis substantially parallel with chassis 10 as the rider shifts his or her weight on the movable seat 340 relative to chassis 10. Additionally, the steering assembly 344 further comprises a steering flange 346 coupled to one end of the steering assembly 344. Depending upon the direction of rotation of the steering assembly 344, the steering flange 346 rotates to the left or right of the chassis 10. At a distal end of the steering flange 346 (opposite the end which couples to steering assembly 344), two tie rods 348 extend outward to wheels 22 on opposite sides of chassis 10 (as shown in FIG. 13) and couple to respective spindle assemblies 350 to which the wheels 22 are attached. The spindle assemblies 350 permit the wheels to rotate relative to the second axle 18. The spindle assemblies 350 and tie rods 348 can, for example, include commercially available spindle assemblies and tie rods utilized for Go-Karts. When the steering assembly 344 rotates in one direction, the steering flange pushes the first tie rod and pulls the second tie rod, allowing the wheels 22 to turn together in one direction. When the steering assembly 344 rotates in an opposing direction, the steering flange pulls the first tie rod and pushes the second tie rod, allowing the wheels 22 to turn together in the opposing direction.

For example, as the rider moves on the powered vehicle 301 by shifting his or her weight on the movable seat 340, the center of gravity of the rider relative to chassis 10 varies causing the movable seat 340 to rotate relative to chassis 10 and, thereby turn wheels 22 relative to the second axle 18 via steering assembly 344, steering flange 346, tie rods 348, and spindle assemblies 350, hence, causing the powered vehicle 301 to steer in a direction substantially the same as the shift in the rider's center of gravity.

Figure 14:
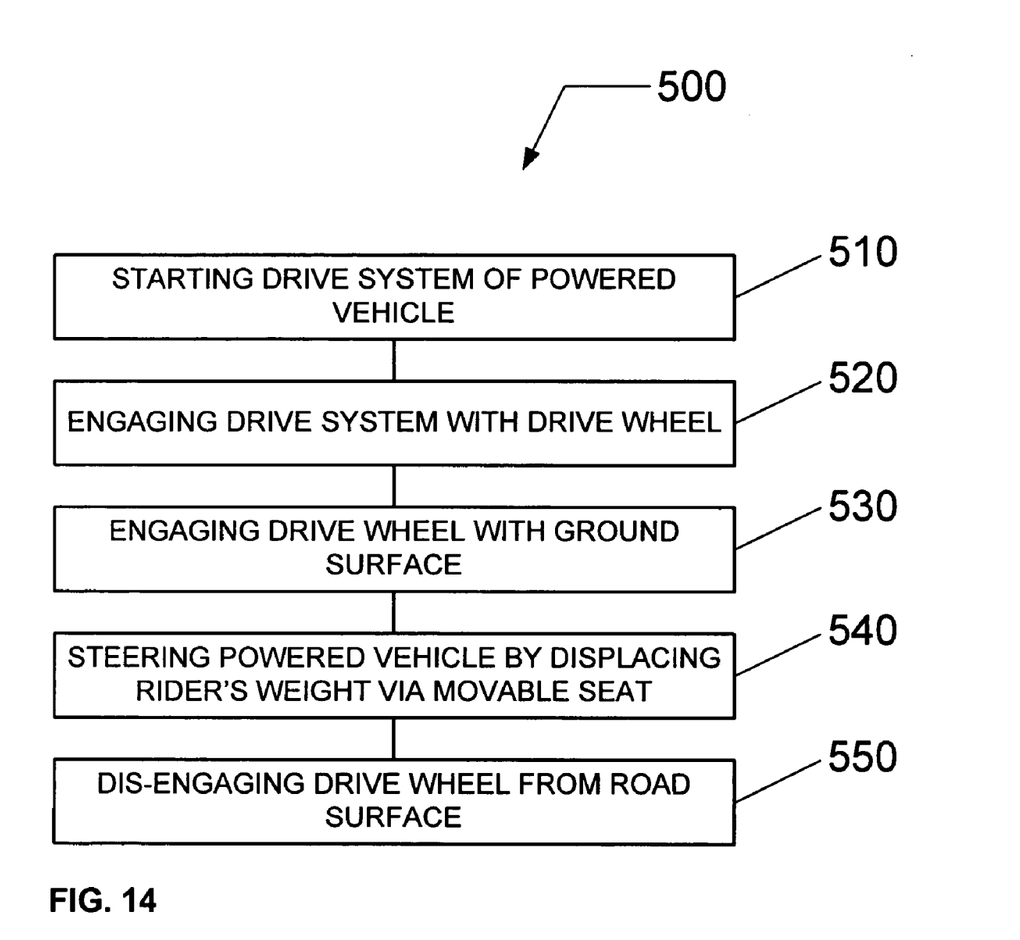
FIG. 14 provides a method of operating a powered vehicle according to yet another embodiment of the invention.

Referring now to FIG. 14, a method for operating a powered vehicle for on or off-road use is described according to another embodiment. The method comprises a flow chart 500 beginning in 510 with starting a drive system configured to propel the powered vehicle. In 520, the drive system is coupled to a drive wheel of the powered vehicle. In 530, the drive wheel engages the ground surface via a clutch mechanism operated by a rider. In 540, the rider steers the powered vehicle by shifting his or her weight relative to the powered vehicle via a movable seat movably coupled to the powered vehicle. In 550, the powered vehicle is stopped by dis-engaging the drive wheel from the ground surface via said clutch mechanism, by releasing a throttle, or utilizing a braking system, or both.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A powered vehicle configured to support a rider, comprising:
   a chassis comprising a first axle coupled to a first end of said chassis and a second axle coupled to a second end of said chassis opposite said first end, wherein said first axle is coupled to at least one wheel and said second axle is coupled to at least two wheels;
   a drive system coupled to said first axle or said second axle, and configured to propel said vehicle by transmitting power to said at least one wheel coupled to said first axle or said at least two wheels coupled to said second axle; and
   a movable seat movably coupled to said chassis and configured to support said rider sitting down on said movable seat, wherein movement of said movable seat relative to said chassis provides a steering mechanism for said powered vehicle, and
   wherein said movement of said movable seat facilitates rotational motion about a horizontal axis that is substantially perpendicular with said first axle or said second axle or both, and wherein said rotational motion about said horizontal axis causes said powered vehicle to steer in a direction substantially the same as a shift in a center of gravity of said rider.

2. A powered vehicle configured to support a rider, comprising:
   a chassis comprising a first axle coupled to a first end of said chassis and a second axle coupled to a second end of said chassis opposite said first end, wherein said first axle is coupled to at least one wheel and said second axle is coupled to at least two wheels;
   a drive system coupled to said first axle or said second axle, and configured to propel said vehicle by transmitting power to said at least one wheel coupled to said first axle or said at least two wheels coupled to said second axle; and
   a movable seat movably coupled to said chassis and configured to support said rider sitting down on said movable seat, wherein movement of said movable seat relative to said chassis provides a steering mechanism for said powered vehicle,
   wherein said chassis comprises an inclined portion at said second end, said inclined portion of said chassis is inclined with respect to a ground surface, and wherein said second axle comprises a truck axle that is coupled to said inclined portion, whereby said rider moving on said movable seat causes a shift in weight of said rider relative to said chassis and a turning of said second axle relative to said chassis.

3. The powered vehicle of claim 1, wherein said movable seat comprises a swivel joint configured to permit rotation of said movable seat relative to said chassis about an axis substantially perpendicular to said movable seat.

4. The powered vehicle of claim 3, wherein said swivel joint comprises a rotational bearing.

5. The powered vehicle of claim 1, wherein said movable seat comprises a pivot joint configured to permit rotation of said movable seat relative to said chassis about an axis substantially parallel to said chassis.

6. The powered vehicle of claim 1, wherein said movable seat comprises a translational joint configured to permit translation of said movable seat relative to said chassis.

7. The powered vehicle of claim 6, wherein said translational joint comprises a linear bearing.

8. A powered vehicle configured to support a rider, comprising:
   a chassis comprising a first axle coupled to a first end of said chassis and a second axle coupled to a second end of said chassis opposite said first end, wherein said first axle is coupled to at least one wheel and said second axle is coupled to at least two wheels;
   a drive system coupled to said first axle or said second axle, and configured to propel said vehicle by transmitting power to said at least one wheel coupled to said first axle or said at least two wheels coupled to said second axle; and
   a movable seat movably coupled to said chassis and configured to support said rider sitting down on said movable seat, wherein movement of said movable seat relative to said chassis provides a steering mechanism for said powered vehicle,
   wherein said movable seat is coupled to a steering assembly, said steering assembly is movably coupled to said chassis and is fixedly coupled via a steering flange to a first tie rod that extends to a first spindle assembly coupling one wheel of said at least two wheels to said second axle and a second tie rod that extends to a second spindle assembly coupling another wheel of said at least two wheels to said second axle, and wherein movement of said movable seat by said rider causes a rotation of said steering assembly and a turning of said at least two wheels in the same direction.

9. The powered vehicle of claim 1, wherein said drive system comprises an internal combustion engine having a drive shaft coupled to said at least one wheel of said first axle.

10. The powered vehicle of claim 9, wherein said drive shaft comprises a wheel coupling member configured to engage said at least one wheel of said first axle at the radial edge of said at least one wheel.

11. The powered vehicle of claim 9, wherein said powered vehicle comprises a clutch mechanism configured to engage said at least one wheel of said first axle to a ground surface and dis-engage said at least one wheel from said ground surface.

12. The powered vehicle of claim 11, wherein said clutch mechanism comprises a pivot hinge coupled to said chassis, a first lever arm coupled to said pivot hinge and having a handle at a distal end of said first lever arm opposite said pivot hinge, and a second lever arm coupled to said pivot hinge and having a ground engagement wheel at a distal end of said second lever arm opposite said pivot hinge, wherein said ground engagement wheel engages said ground surface and said at least one wheel of said first axle dis-engages said ground surface when said first lever arm is in a first position, and said ground engagement wheel dis-engages said ground surface and said at least one wheel of said first axle engages said ground surface when said first lever arm is in a second position.

13. The powered vehicle of claim 9, wherein said drive system comprises a two-stroke engine or a four-stroke engine.

14. The powered vehicle of claim 1, wherein said drive system comprises an electric motor having a drive shaft coupled to said at least one wheel of said first axle, or said first axle, or said second axle.

15. The powered vehicle of claim 1, further comprising:
a braking system configured to decelerate said vehicle.

16. The powered vehicle of claim 15, wherein said braking system comprises a braking lever coupled to said chassis, and configured to brake said powered vehicle when activated by said rider to drag on a ground surface which said powered vehicle moves.

17. The powered vehicle of claim 15, wherein said braking system comprises a braking lever coupled to said chassis, and configured to brake said powered vehicle when activated by said rider to apply friction to one or more wheels of said at least one wheel coupled to said first axle or said at least two wheels coupled to said second axle.

18. The powered vehicle of claim 1, further comprising:
a foot rest coupled to said chassis, and configured to support the feet of said rider.

19. The powered vehicle of claim 18, wherein said foot rest is configured to perform at least one of fold with, or detach from, or retract along said chassis.

20. The powered vehicle of claim 1, further comprising:
a throttle mechanism configured to be operated by said rider to accelerate or decelerate said powered vehicle.

* * * * *